United States Patent
O'Malley et al.

(10) Patent No.: US 6,625,271 B1
(45) Date of Patent: Sep. 23, 2003

(54) SCALABLE AUDIO CONFERENCE PLATFORM

(75) Inventors: William O'Malley, Georgetown, MA (US); Arthur P. Leondires, Atkinson, NH (US)

(73) Assignee: Octave Communications, Inc., Westminster, CO (US)

( * ) Notice: Subject to any disclaimer, the term of this patent is extended or adjusted under 35 U.S.C. 154(b) by 0 days.

(21) Appl. No.: 09/532,602

(22) Filed: Mar. 22, 2000

Related U.S. Application Data

(60) Provisional application No. 60/148,975, filed on Aug. 13, 1999, and provisional application No. 60/125,440, filed on Mar. 22, 1999.

(51) Int. Cl.$^7$ ............................................. H04M 1/66
(52) U.S. Cl. .................................................. 379/202.01
(58) Field of Search ....................... 379/202.01, 203.01, 379/204.01, 205.01

(56) References Cited

U.S. PATENT DOCUMENTS

| | | | | |
|---|---|---|---|---|
| 3,622,708 A | * | 11/1971 | Guenther et al. ...... | 379/202.01 |
| 3,692,947 A | * | 9/1972 | Lewis ......................... | 370/266 |
| 4,109,111 A | | 8/1978 | Cook ........................... | 179/18 |
| 4,416,007 A | | 11/1983 | Huizinga et al. ............. | 370/62 |
| 4,485,469 A | | 11/1984 | Witmore ...................... | 370/68 |
| 4,541,087 A | | 9/1985 | Comstock .................... | 370/62 |
| 4,797,876 A | | 1/1989 | Ratcliff ........................ | 370/62 |
| 5,029,162 A | | 7/1991 | Epps ............................ | 370/77 |
| 5,210,794 A | * | 5/1993 | Brungard .................... | 379/264 |
| 5,495,522 A | | 2/1996 | Allen et al. | |
| 5,841,763 A | | 11/1998 | Leondires et al. .......... | 370/260 |

OTHER PUBLICATIONS

Shaddock, Robert: "DSPs or microprocessors–which device to use?" Computer Design., Aug. 1998, pp. 54–61.

Liu J–M et al: "A Digital Multipoint Telecommunication Conferencer VLSI" Proceedings of the Custom Integrated Circuits Conference, U.S., New York, IEEE, vol. Conf. 7, May 1985, pp. 88–91.

* cited by examiner

*Primary Examiner*—Creighton Smith
(74) *Attorney, Agent, or Firm*—Dorr, Carson, Sloan & Birney, P.C.

(57) ABSTRACT

An audio conferencing platform includes data bus (e.g., a time division multiplex (TDM) bus), a controller, and an interface circuit that receives audio signals from a plurality of conference participants and provides digitized audio signals in assigned time slots over the TDM bus. The audio conferencing platform also includes a plurality of digital signal processors (DSPs) adapted to communicate on the TDM bus with the interface circuit. At least one of the DSPs sums a plurality of the digitized audio signals associated with conference participants who are speaking, to provide a summed conference signal. This DSP provides the summed conference signal to at least one of the other plurality of DSPs, which removes the digitized audio signal associated with a speaker whose voice is included in the summed conference signal, to provide a customized conference audio signal to each of the speakers.

19 Claims, 9 Drawing Sheets

SCALABLE AUDIO CONFERENCE PLATFORM

CROSS REFERENCE TO RELATED APPLICATIONS

This application claims benefit of provisional No. 60/148,975 filed Aug. 13, 1999 which claims benefit of 60/125,440 filed Mar. 22, 1999.

This application contains subject matter related to a commonly assigned application designated Ser. No. 09/532,983, filed Mar. 22, 2000, entitled "Audio Conference Platform System and Method for Broadcasting a Real-Time Audio Conference Over the Internet". This application is hereby incorporated herein by reference.

BACKGROUND OF THE INVENTION

The present invention relates to telephony, and in particular to an audio conferencing platform.

Audio conferencing platforms are well known. For example, see U.S. Pat. Nos. 5,483,588 and 5,495,522. Audio conferencing platforms allow conference participants to easily schedule and conduct audio conferences with a large number of users. In addition, audio conference platforms are generally capable of simultaneously supporting many conferences.

A problem with audio conference platforms has been their distributed task system architectures. For example, the system disclosed in U.S. Pat. No. 5,495,522 employs a distributed conference summing architecture, wherein each digital signal processor (DSP) generates a separate output signal (i.e., separate summed conference audio) for each of the phone channels that the DSP supports. That is, this prior art system generates a separate summed conference audio output signal for each of the phone channels. This is an inefficient system architecture since the same task is being simultaneously executed by a number of DSP resources.

Therefore, there is a need for a system that centralizes the audio conference summing task and provides a scalable system architecture.

SUMMARY OF THE INVENTION

Briefly, according to the present invention, an audio conferencing platform includes a data bus, a controller, and an interface circuit that receives audio signals from a plurality of conference participants and provides digitized audio signals in assigned time slots over the data bus. The audio conferencing platform also includes a plurality of digital signal processors (DSPs) adapted to communicate on the TDM bus with the interface circuit. At least one of the DSPs sums a plurality of the digitized audio signals associated with conference participants who are speaking to provide a summed conference signal. This DSP provides the summed conference signal to at least one of the other plurality of DSPs, which removes the digitized audio signal associated with a speaker whose voice is included in the summed conference signal, thus providing a customized conference audio signal to each of the speakers.

In a preferred embodiment, the audio conferencing platform configures at least one of the DSPs as a centralized audio mixer and at least another one of the DSPs as an audio processor. Significantly, the centralized audio mixer performs the step of summing a plurality of the digitized audio signals associated with conference participants who are speaking, to provide the summed conference signal. The centralized audio mixer provides the summed conference signal to the audio processor(s) for post processing and routing to the conference participants. The post processing includes removing the audio associated with a speaker from the conference signal to be sent to the speaker. For example, if there are forty conference participants and three of the participants are speaking, then the summed conference signal will include the audio from the three speakers. The summed conference signal is made available on the data bus to the thirty-seven non-speaking conference participants. However, the three speakers each receive an audio signal that is equal to the summed conference signal less the digitized audio signal associated with the speaker. Removing the speaker's voice from the audio he hears reduces echoes.

The centralized audio mixer also receives DTMF detect bits indicative of the digitized audio signals that include a DTMF tone. The DTMF detect bits may be provided by another of the DSPs that is programmed to detect DTMF tones. If the digitized audio signal is associated with a speaker, but the digitized audio'signal includes a DTMF tone, the centralized conference mixer will not include the digitized audio signal in the summed conference signal while that DTMF detect bit signal is active. This ensures conference participants do not hear annoying DTMF tones in the conference audio. When the DTMF tone is no longer present in the digitized audio signal, the centralized conference mixer may include the audio signal in the summed conference signal.

The audio conference platform is capable of supporting a number of simultaneous conferences (e.g., 384). As a result, the audio conference mixer provides a summed conference signal for each of the conferences.

Each of the digitized audio signals may be preprocessed. The preprocessing steps include decompressing the signal (e.g., $\mu$-Law or A-Law compression), and determining if the magnitude of the decompressed audio signal is greater than a detection threshold. If it is, then a speech bit associated with the digitized audio signal is set. Otherwise, the speech bit is cleared.

Advantageously, the centralized conference mixer reduces repetitive tasks from being distributed between the plurality of DSPs. In addition, centralized conference mixing provides a system architecture that is scalable and thus easily expanded.

These and other objects, features and advantages of the present invention will become apparent in light of the following detailed description of preferred embodiments thereof, as illustrated in the accompanying drawings.

DETAILED DESCRIPTION OF THE INVENTION

Figure 1:
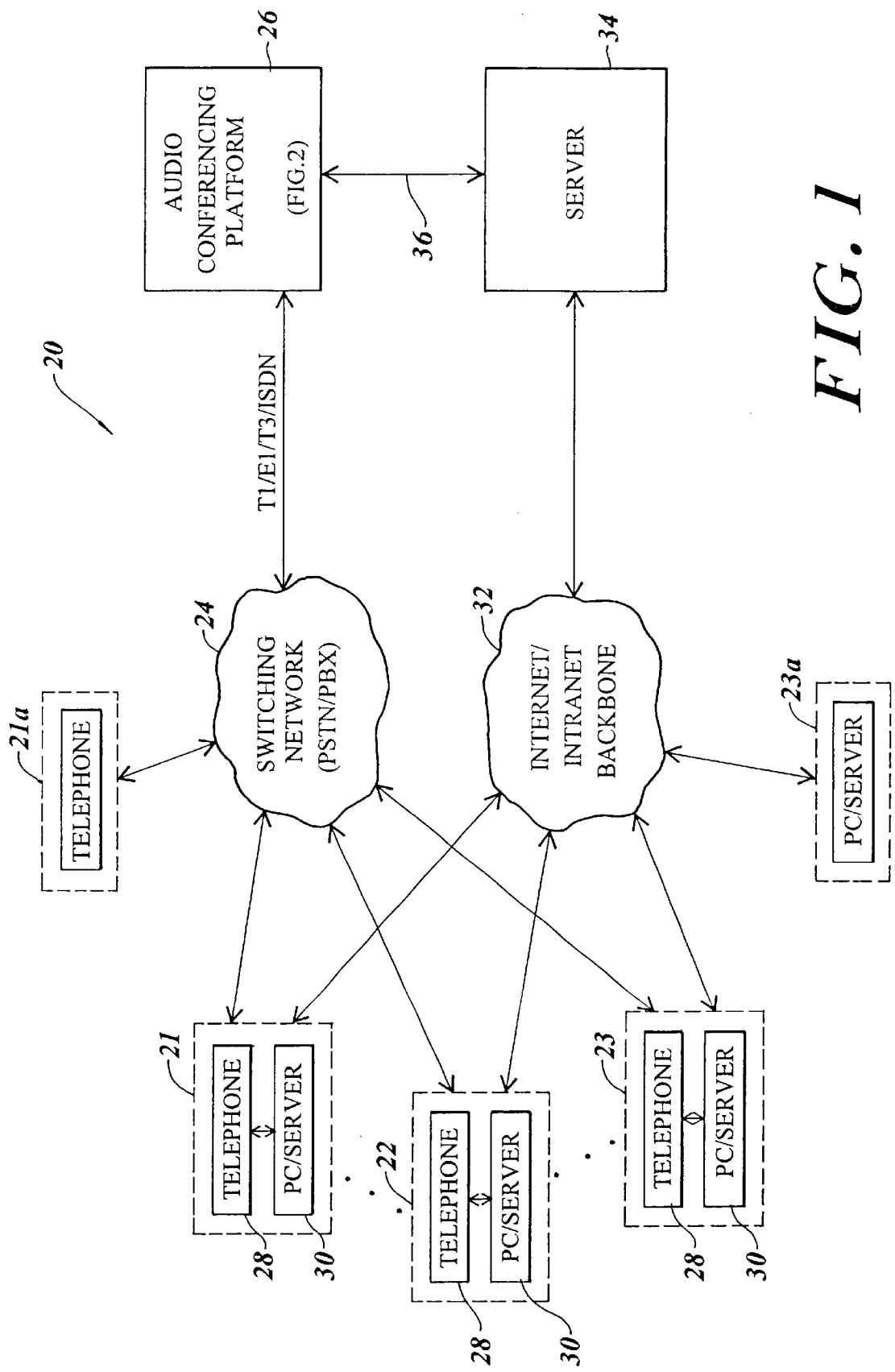
FIG. 1 is a pictorial illustration of a conferencing system.

FIG. 1 is a pictorial illustration of a conferencing system 20. The system 20 connects a plurality of user sites 21–23 through a switching network 24 to an audio conferencing platform 26. The plurality of user sites may be distributed worldwide, or at a company facility/campus. For example, each of the user sites 21–23 may be in different cities and connected to the audio platform 26 via the switching network 24, that may include PSTN and PBX systems. The connections between the user sites and the switching network 24 may include T1, E1, T3 and ISDN lines.

Each user site 21–23 preferably includes a telephone 28 and a computer/server 30. However, a conferences site may only include either the telephone or the computer/server. The computer/server 30 may be connected via an Internet/intranet backbone 32 to a server 34. The audio conferencing platform 26 and the server 34 are connected via a data link 36 (e.g., a 10/100 BaseT Ethernet link). The computer 30 allows the user to participate in a data conference simultaneous to the audio conference via the server 34. In addition, the user can use the computer 30 to interface (e.g., via a browser) with the server 34 to perform functions such as conference control, administration (e.g., system configuration, billing, reports, . . . ), scheduling and account maintenance. The telephone 28 and the computer 30 may cooperate to provide voice over the Internet/intranet 32 to the audio conferencing platform 26 via the data link 36.

Figure 2:
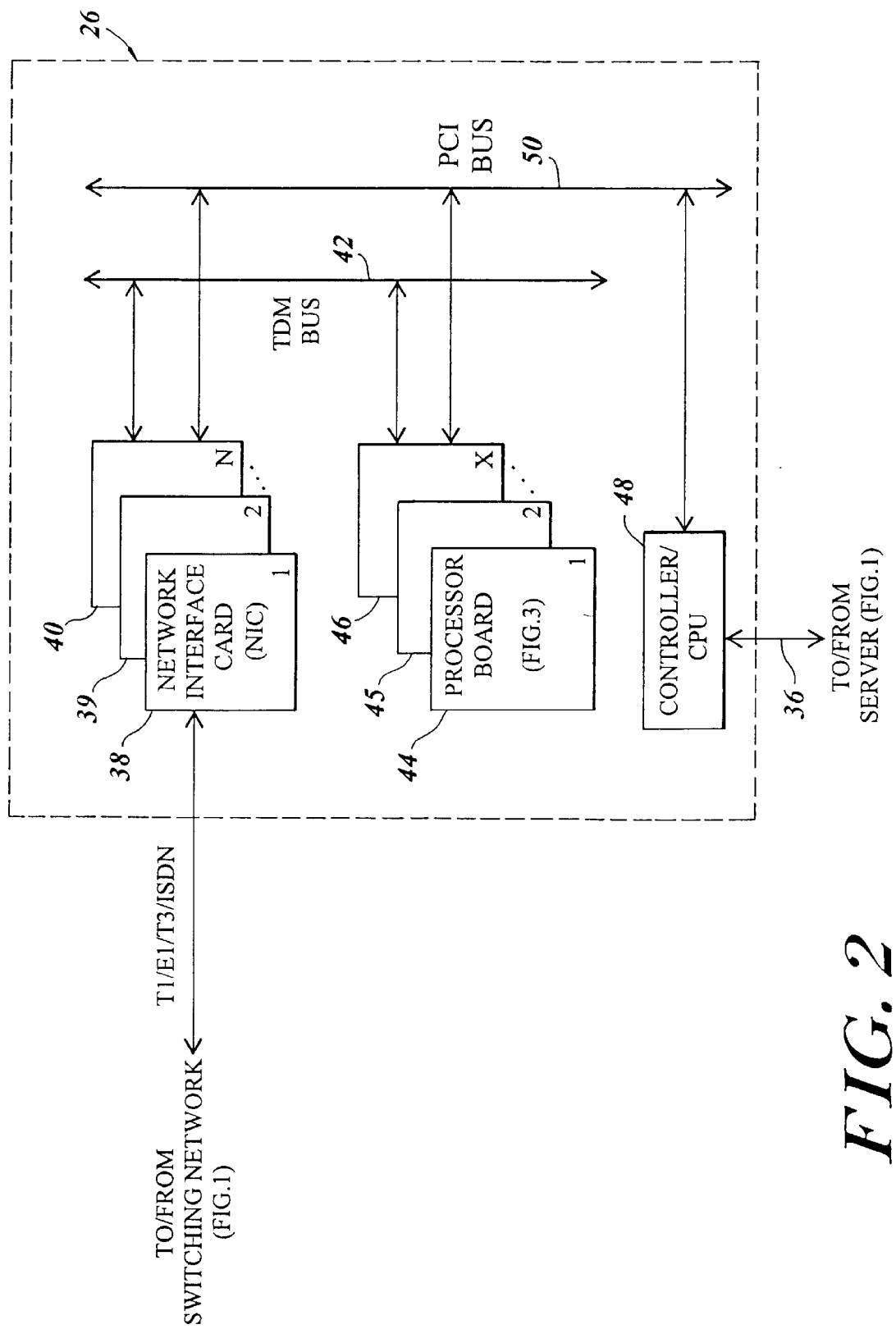
FIG. 2 illustrates a functional block diagram of an audio conferencing platform within the conferencing system of FIG. 1.

FIG. 2 illustrates a functional block diagram of the audio conferencing platform 26. The audio conferencing platform 26 includes a plurality of network interface cards (NICs) 38–40 that receive audio information from the switching network 24 (FIG. 1). Each NIC may be capable of handling a plurality of different trunk lines (e.g., eight). The data received by the NIC is generally an 8-bit $\mu$-Law or A-Law sample. The NIC places the sample into a memory device (not shown), which is used to output the audio data onto a data bus. The data bus is preferably a time division multiplex (TDM) bus, for example based upon the H.110 telephony standard.

The audio conferencing platform 26 also includes a plurality of processor boards 44–46 that receive and transmit data to the NICs 38–40 over the TDM bus 42. The NICs and the processor boards 44–46 also communicate with a controller/CPU board 48 over a system bus 50. The system bus 50 is preferably based upon the compact PCi standard. The CPU/controller communicates with the server 34 (FIG. 1) via the data link 36. The controller/CPU board may include a general purpose processor such as a 200 MHz Pentium™ CPU manufactured by Intel Corporation, a processor from AMD or any other similar processor (including an ASIC) having sufficient MIPS to support the present invention.

Figure 3:
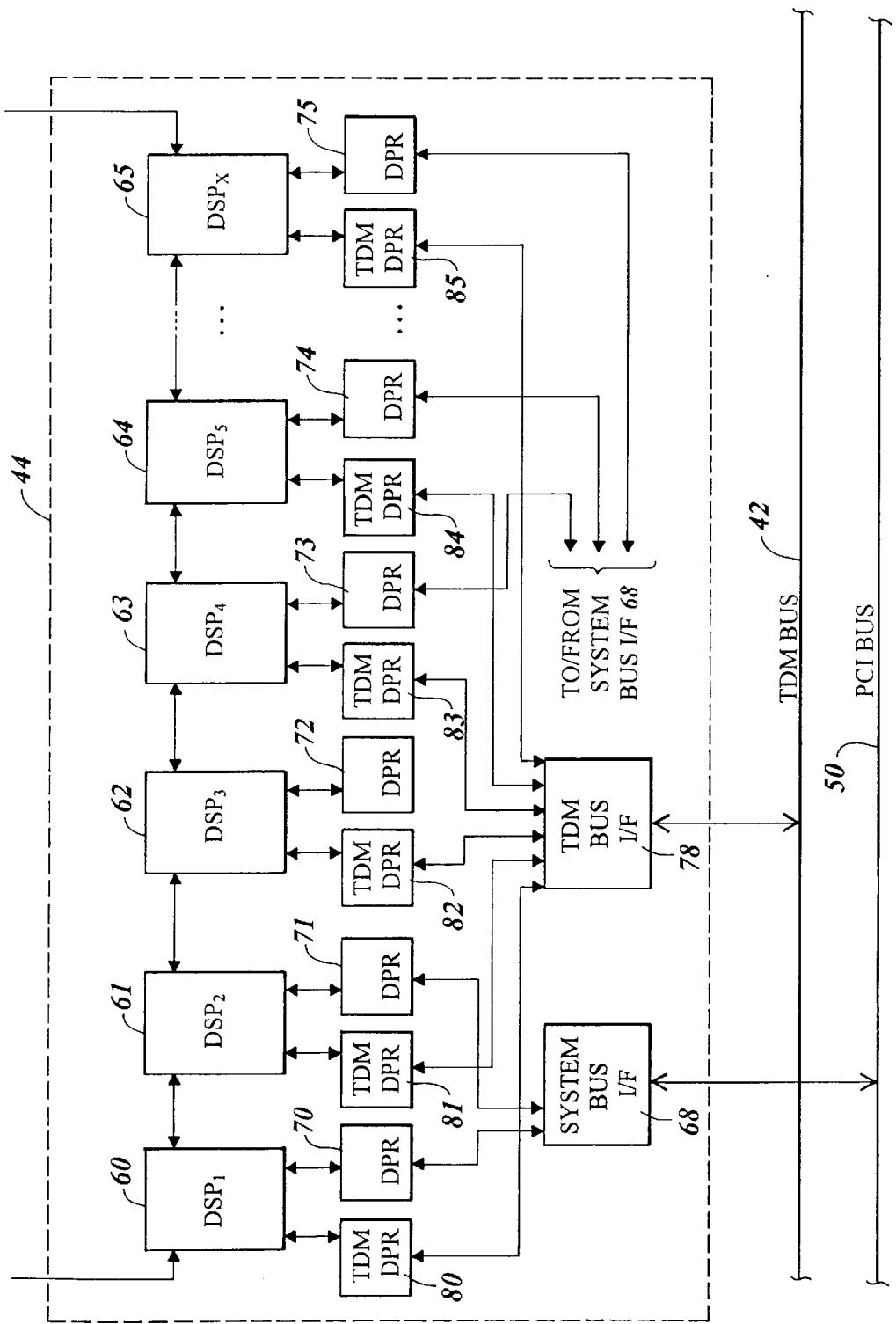
FIG. 3 is a block diagram illustration of a processor board within the audio conferencing platform of FIG. 2.

FIG. 3 is block diagram illustration of the processor board 44 of the audio conferencing platform. The board 44 includes a plurality of dynamically programmable digital signal processors 60–65. Each digital signal processor (DSP) is an integrated circuit that communicates with the controller/CPU card 48 (FIG. 2) over the system bus 50. Specifically, the processor board 44 includes a bus interface 68 that interconnects the DSPs 60–65 to the system bus 50. Each DSP also includes an associated dual port RAM (DPR) 70–75 that buffers commands and data for transmission between the system bus 50 and the associated DSP.

Each DSP 60–65 also transmits data over and receives data from the TDM bus 42. The processor card 44 includes a TDM bus interface 78 that performs any necessary signal conditioning and transformation. For example, if the TDM bus is a H.110 bus then it includes thirty-two serial lines, as a result the TDM bus interface may include a serial-to-parallel and a parallel-to-serial interface. An example, of a serial-to-parallel and a parallel-to-serial interface is disclosed in commonly assigned U.S. Provisional Patent Application designated Ser. No. 60/105,369 filed Oct. 23, 1998 and entitled "Serial-to-Parallel/Parallel-to-Serial Conversion Engine". This application is hereby incorporated by reference.

Each DSP 60–65 also includes an associated TDM dual port RAM 80–85 that buffers data for transmission between the TDM bus 42 and the associated DSP.

Each of the DSPs is preferably a general purpose digital signal processor IC, such as the model number TMS320C6201 processor available from Texas Instruments. The number of DSPs resident on the processor board 44 is a function of the size of the integrated circuits, their power consumption and the heat dissipation ability of the processor board. For example, there may be between four and ten DSPs per processor board.

Executable software applications may be downloaded from the controller/CPU 48 (FIG. 2) via the system bus 50 to a selected one(s) of the DSPs 60–65. Each of the DSPs is also connected to an adjacent DSP via a serial data link.

Figure 4:
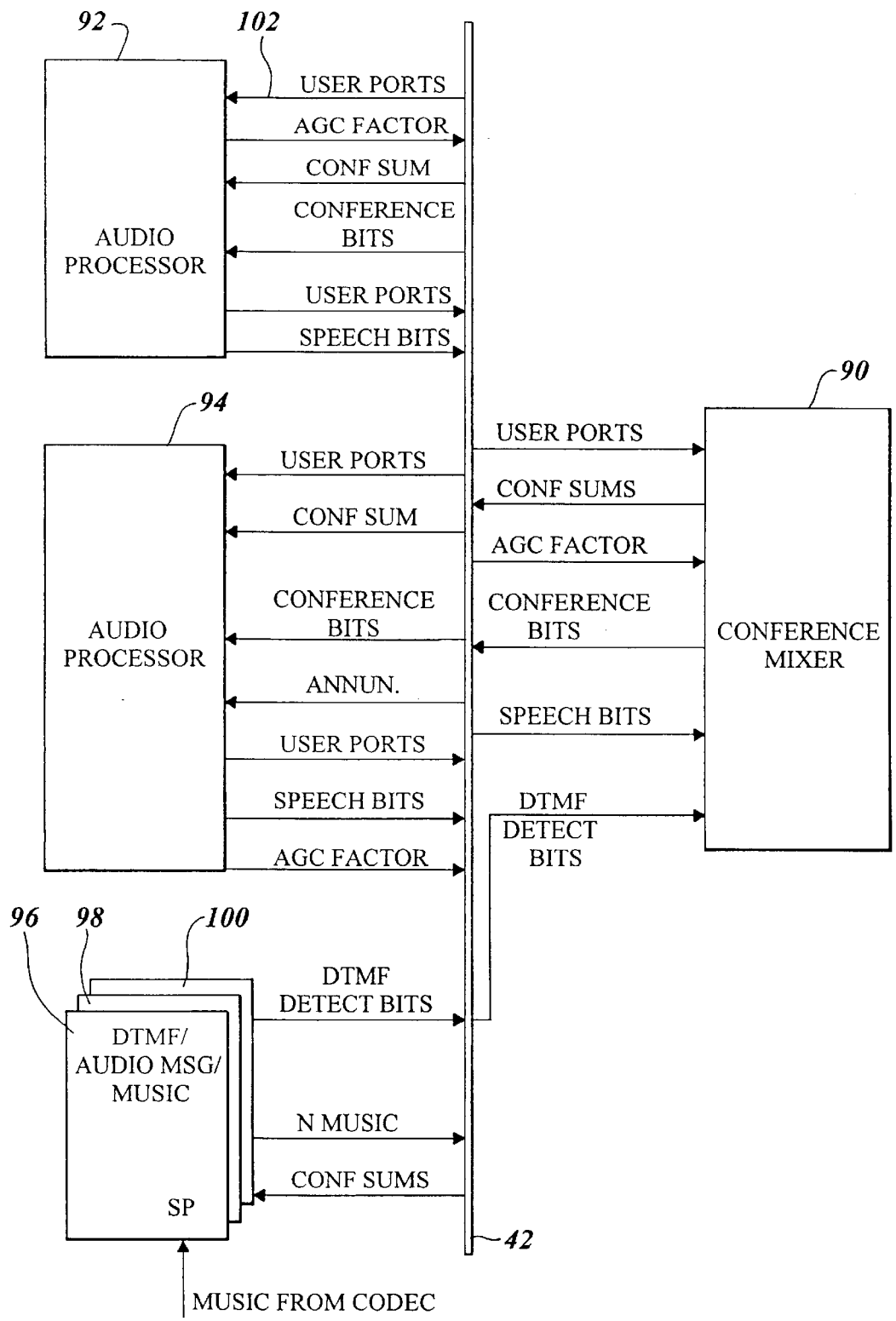
FIG. 4 is a functional block diagram illustration of the resources on the processor board of FIG. 3.

FIG. 4 is a functional illustration of the DSP resources on the processor board 44 illustrated in FIG. 3. Referring to FIGS. 3 and 4, the controller/CPU 48 (FIG. 2) downloads executable program instructions to a DSP based upon the function that the controller/CPU assigns to the DSP. For example, the controller/CPU may download executable program instructions for the $DSP_3$ 62 to function as an audio conference mixer 90, while the $DSP_2$ 61 and the $DSP_4$ 63 may be configured as audio processors 92, 94, respectively. Other DSPs 50, 65 may be configured by the controller/CPU 48 (FIG. 2) to provide services such as DTMF detection 96, audio message generation 98 and music play back 90.

Each audio processor 92, 94 is capable of supporting a certain number of user ports (i.e., conference participants). This number is based upon the operational speed of the various components within the processor board, and the over-all design of the system. Each audio processor 92, 94 receives compressed audio data 102 from the conference participants over the TDM bus 42.

The TDM bus 42 may support 4096 time slots, each having a bandwidth of 64 kbps. The timeslots are generally dynamically assigned by the controller/CPU 48 (FIG. 2) as needed for the conferences that are currently occurring. However, one of ordinary skill in the art will recognize that in a static system the timeslots may be nailed up.

Figure 5:
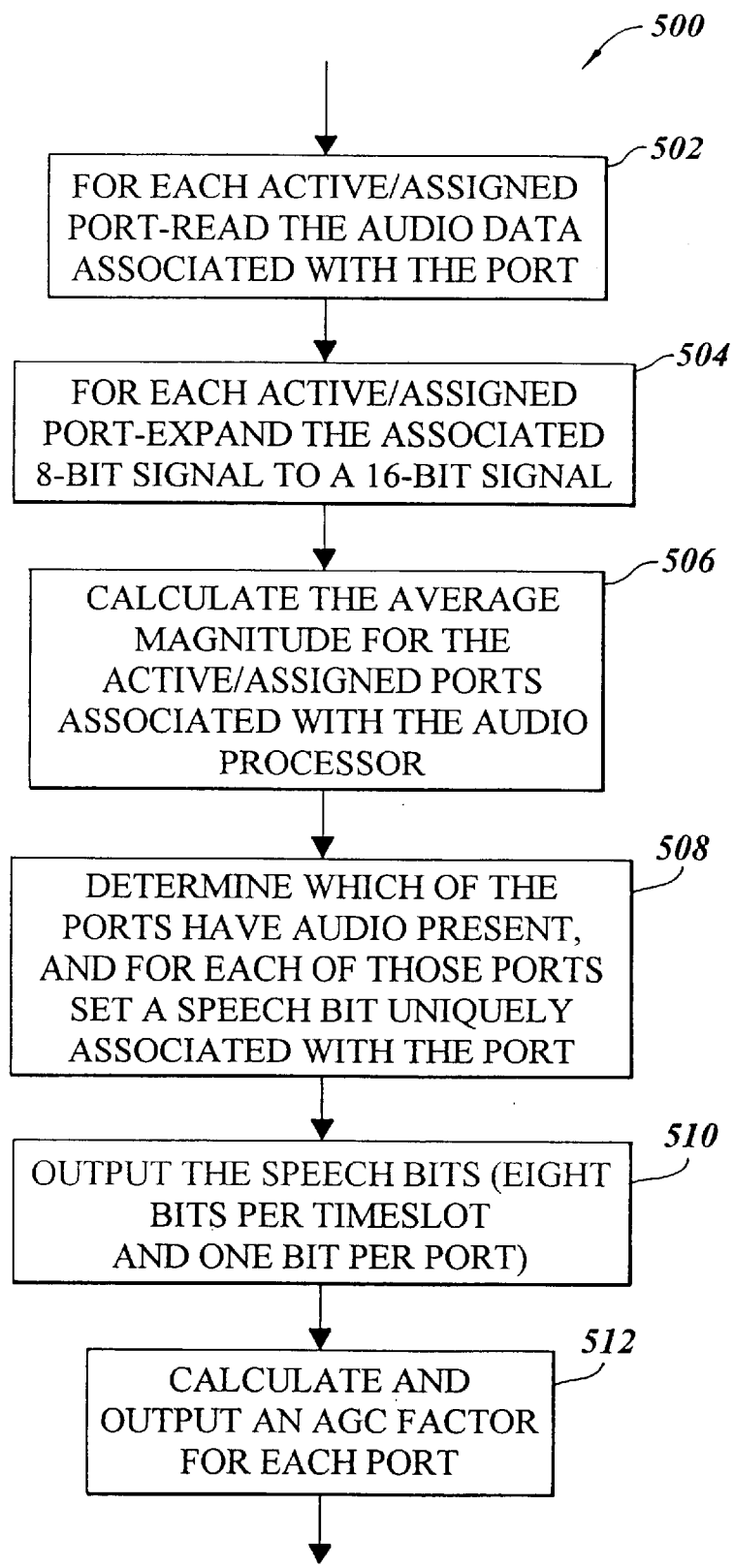
FIG. 5 is a flow chart illustration of audio processor processing for signals received from the network interface cards over the TDM bus.

FIG. 5 is a flow chart illustration of processing steps 500 performed by each audio processor on the digitized audio signals received over the TDM bus 42 from the NICs 38–40 (FIG. 2). The executable program instructions associated with these processing steps 500 are typically downloaded to the audio processors 92, 94 (FIG. 4) by the controller/CPU 48 (FIG. 2). The download may occur during system initialization or reconfiguration. These processing steps 500 are executed at least once every 125 $\mu$seconds to provide audio of the requisite quality.

For each of the active/assigned ports for the audio processor, step 502 reads the audio data for that port from the TDM dual port RAM associated with the audio processor. For example, if $DSP_2$ 61 (FIG. 3) is configured to perform the function of audio processors 92 (FIG. 4), then the data is read from the read bank of the TDM dual port RAM 81. If the audio processor 92 is responsible for 700 active/assigned ports, then step 502 reads the 700 bytes of associated audio data from the TDM dual port RAM 81. Each audio processor includes a time slot allocation table (not shown) that specifies the address location in the TDM dual port RAM for the audio data from each port.

Since each of the audio signals is compressed (e.g., $\mu$-Law, A-Law, etc), step 604 decompresses each of the 8-bit signals to a 16-bit word. Step 506 computes the average magnitude (AVM) for each of the decompressed signals associated with the ports assigned to the audio processor.

Step 508 is performed next to determine which of the ports are speaking. This step compares the average magnitude for the port computed in step 506 against a predetermined magnitude value representative of speech (e.g., −35 dBm). If average magnitude for the port exceeds the predetermined magnitude value representative of speech, a speech bit associated with the port is set. Otherwise, the associated speech bit is cleared. Each port has an associated speech bit. Step 510 outputs all the speech bits (eight per timeslot) onto the TDM bus. Step 512 is performed to calculate an automatic gain correction (AGC) factor for each port. To compute an AGC value for the port, the AVM value is converted to an index value associated with a table containing gain/attenuation factors. For example, there may be 256 index values, each uniquely associated with 256 gain/attenuation factors. The index value is used by the conference mixer 90 (FIG. 4) to determine the gain/attenuation factor to be applied to an audio signal that will be summed to create the conference sum signal.

Figure 6:
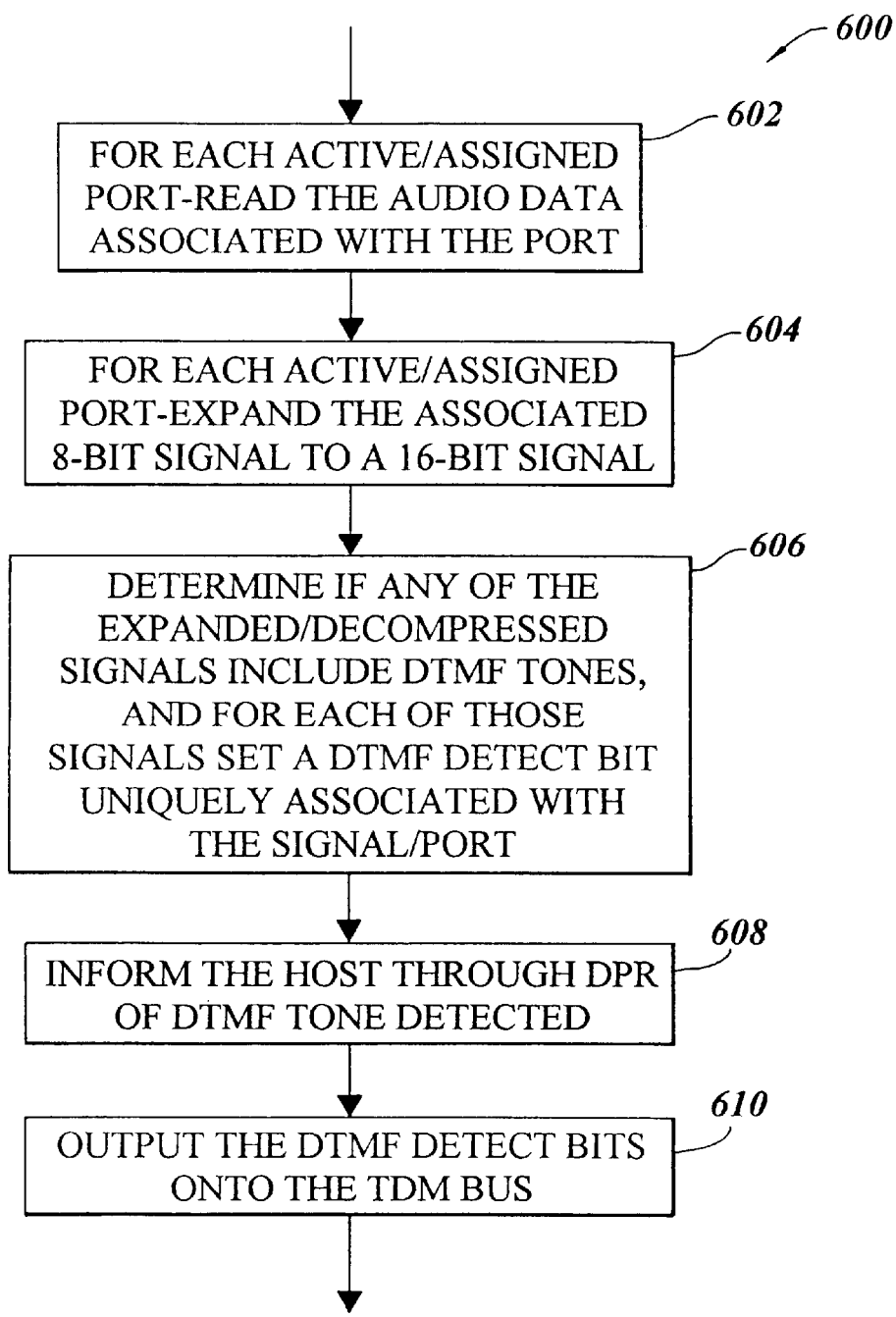
FIG. 6 is a flow chart illustration of the DTMF tone detection processing.

FIG. 6 is a flow chart illustration of the DTMF tone detection processing 600. These processing steps 600 are performed by the DTMF processor 96 (FIG. 4), preferably at least once every 125 $\mu$seconds, to detect DTMF tones within on the digitized audio signals from the NICs 38–40 (FIG. 2). One or more of the DSPs may be configured to operate as a DTMF tone detector. The executable program instructions associated with the processing steps 600 are typically downloaded by the controller/CPU 48 (FIG. 2) to the DSP designated to perform the DTMF tone detection function. The download may occur during initialization or system reconfiguration.

For an assigned number of the active/assigned ports of the conferencing system, step 602 reads the audio data for the port from the TDM dual port RAM associated with the DSP(s) configured to perform the DTMF tone detection function. Step 604 then expands the 8-bit signal to a 16-bit word. Next, step 606 tests each of these decompressed audio signals to determine if any of the signals includes a DTMF tone. For any signal that does include a DTMF tone, step 606 sets a DTMF detect bit associated with the port. Otherwise, the DTMF detect bit is cleared. Each port has an associated DTMF detect bit. Step 608 informs the controller/CPU 48 (FIG. 3) which DTMF tone was detected, since the tone is representative of system commands and/or data from a conference participant. Step 610 outputs the DTMF detect bits onto the TDM bus.

Figure 7A:
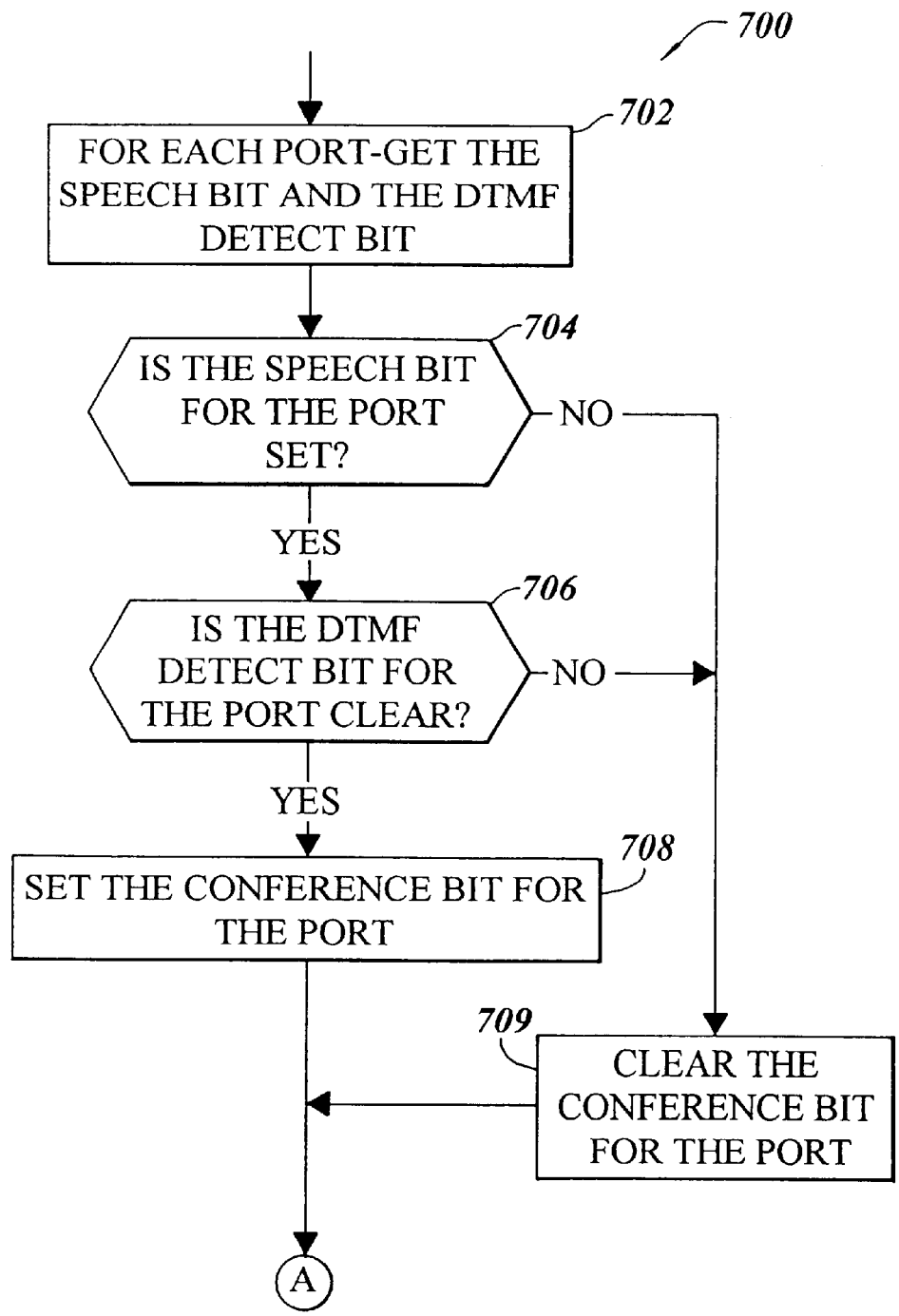
FIGS. 7A–7B together provide a flow chart illustration of the conference mixer processing to create a summed conference signal.
Figure 7B:
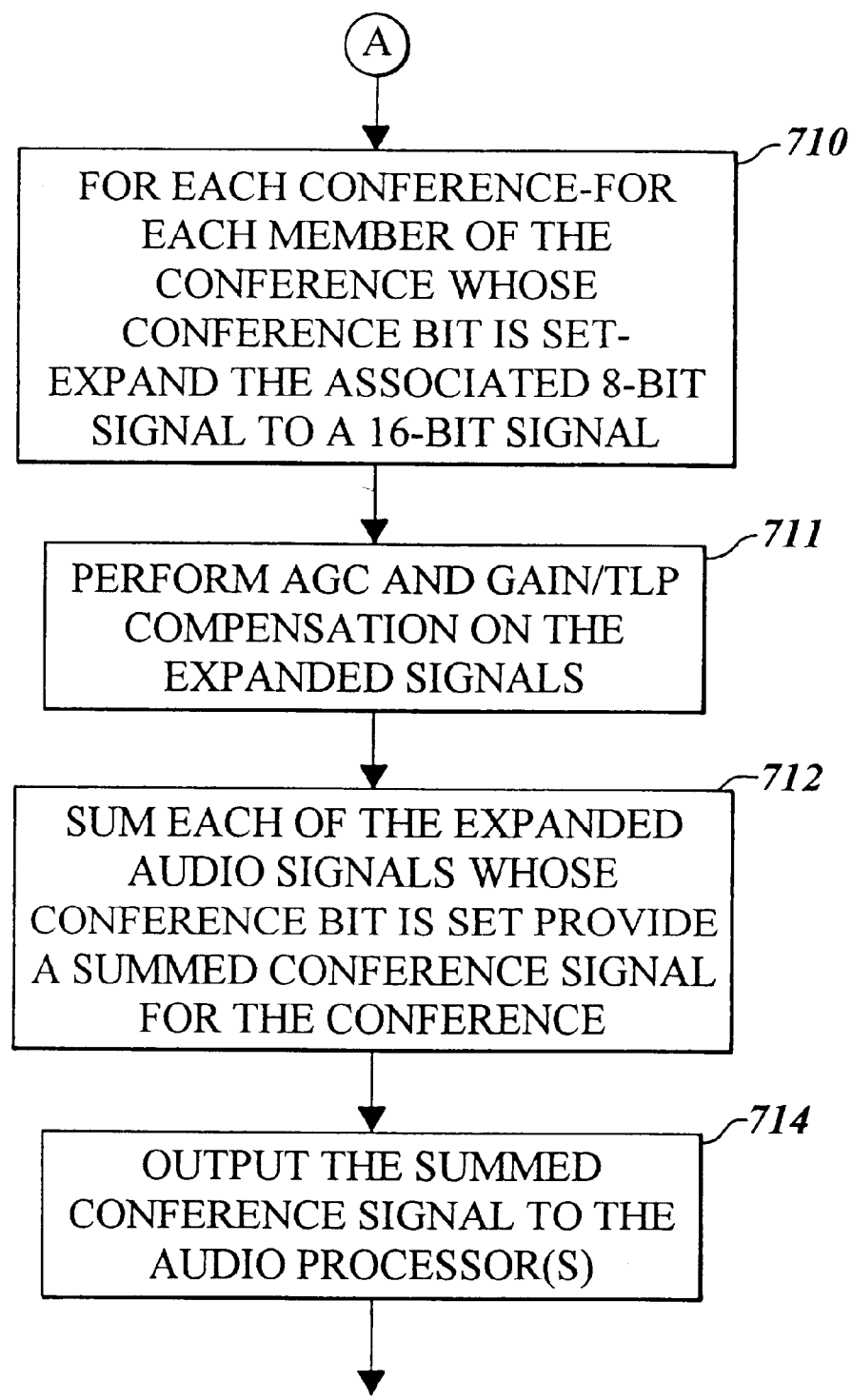

FIGS. 7A–7B collectively provide a flow chart illustration of processing steps 700 performed by the audio conference mixer 90 (FIG. 4) at least once every 125 $\mu$seconds to create a summed conference signal for each conference. The executable program instructions associated with the processing steps 700 are typically downloaded by the controller/CPU 48 (FIG. 2) over the system bus 50 (FIG. 2) to the DSP designated to perform the conference mixer function. The download may occur during initialization or system reconfiguration.

Referring to FIG. 7A, for each of the active/assigned ports of the audio conferencing system, step 702 reads the speech bit and the DTMF detect bit received over the TDM bus 42 (FIG. 4). Alternatively, the speech bits may be provided over a dedicated serial link that interconnects the audio processor and the conference mixer. Step 704 is then performed to determine if the speech bit for the port is set (i.e., was energy detected on that port?). If the speech bit is set, then step 706 is performed to see if the DTMF detect bit for the port is also set. If the DTMF detect bit is clear, then the audio received by the port is speech and the audio does not include DTMF tones. As a result, step 708 sets the conference bit for that port, otherwise step 709 clears the conference bit associated with the port. Since the audio conferencing platform 26 (FIG. 1) can support many simultaneous conferences (e.g., 384), the controller/CPU 48 (FIG. 2) keeps track of the conference that each port is assigned to and provides that information to the DSP performing the audio conference mixer function. Upon the completion of step 708, the conference bit for each port has been updated to indicate the conference participants whose voice should be included in the conference sum.

Referring to FIG. 7B, for each of the conferences, step 710 is performed to decompress each of the audio signals associated with conference bits that are set. Step 711 performs AGC and gain/TLP compensation on the expanded signals from step 710. Step 712 is then performed to sum each of the compensated audio samples to provide a summed conference signal. Since many conference participants may be speaking at the same time, the system preferably limits the number of conference participants whose voice is summed to create the conference audio. For example, the system may sum the audio signals from a maximum of three speaking conference participants. Step 714 outputs the summed audio signal for the conference to the audio processors. In a preferred embodiment, the summed audio signal for each conference is output to the audio processor(s) over the TDM bus. Since the audio a conferencing platform supports a number of simultaneous conferences, steps 710–714 are performed for each of the conferences.

Figure 8:
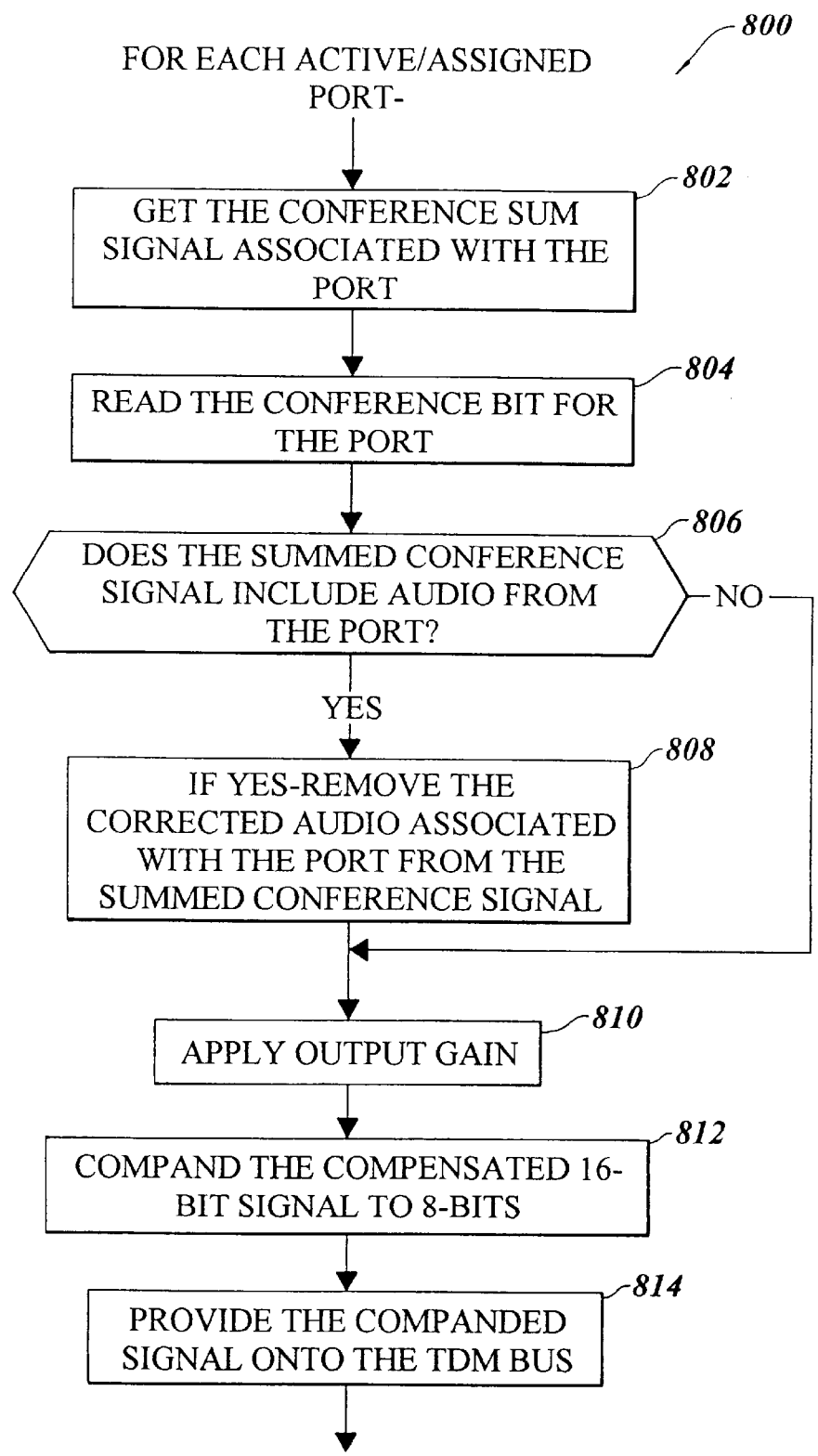
FIG. 8 is a flow chart illustration of audio processor processing for signals to be output to the network interface cards via the TDM bus.

FIG. 8 is a flow chart illustration of processing steps 800 performed by each audio processor to output audio signals over the TDM bus to conference participants. The executable program instructions associated with these processing steps 800 are typically downloaded to each audio processor by the controller/CPU during system initialization or reconfiguration. These steps 800 are also preferably executed at least once every 125 $\mu$seconds.

For each active/assigned port, step 802 retrieves the summed conference signal for the conference that the port is assigned to. Step 804 reads the conference bit associated with the port, and step 806 tests the bit to determine if audio from the port was used to create the summed conference signal. If it was, then step 808 removes the gain (e.g., AGC and gain/TLP) compensated audio signal associated with the port from the summed audio signal. This step removes the speaker's own voice from the conference audio. If step 806 determines that audio from the port was not used to create the summed conference signal, then step 808 is bypassed. To prepare the signal to be output, step 810 applies a gain, and step 812 compresses the gain corrected signal. Step 814 then outputs the compressed signal onto the TDM bus for routing to the conference participant associated with the port, via the NIC (FIG. 2).

Notably, the audio conferencing platform 26 (FIG. 1) computes conference sums at a central location. This reduces the distributed summing that would otherwise have to be performed to ensure that the ports receive the proper conference audio. In addition, the conference platform is readily expandable by adding additional NICs and/or processor boards. That is, the centralized conference mixer architecture allows the audio conferencing platform to be scaled to the user's requirements.

One of ordinary skill will appreciate that as processor speeds continue to increase, that the overall system design is a function of the processing ability of each DSP. For example, if a sufficiently fast DSP was available, then the functions of the audio conference mixer, the audio processor and the DTMF tone detection and the other DSP functions may be performed by a single DSP.

Although the present invention has been shown and described with respect to several preferred embodiments thereof, various changes, omissions and additions to the form and detail thereof, may be made therein, without departing from the spirit and scope of the invention.

What is claimed is:

1. An audio conferencing system, comprising:
    a data bus;
    a network interface circuit that receives audio signals associated with participants in a conference, and provides digitized audio signals in assigned time slots over said data bus; and
    a plurality of digital signal processors adapted to communicate on said data bus, wherein a first of said plurality of digital signal processors receives said digitized audio signals associated with conference participants who are speaking, and sums a plurality of said digitized audio signals to provide to a second of said plurality of digital signal processors a summed conference signal and a conference list indicative of said digitized audio signals summed to generate said summed conference signal, wherein for each conference participant on said conference list said second of said plurality of digital signal processors removes said digitized audio signal associated with the conference participant from said summed conference signal to provide a unique conference signal for the conference participant.

2. The audio conferencing system of claim 1, further comprising:
    a system bus; and
    a controller that communicates with said plurality of digital signal processors over said system bus, and downloads executable program instructions to said digital signal processors.

3. The audio conferencing system of claim 1, wherein said first of said plurality of digital signal processors is configured as an audio conference mixer, said second of said plurality of digital signal processors is configured as an audio processor that receives said digitized audio signals and determines which of said digitized audio signals comprises voice data and provides a speech list indicative thereof to said audio conference mixer, which sums a plurality of said digitized audio signals identified in said speech list to provide said summed conference signal.

4. The audio conferencing system of claim 3, wherein said speech list comprises a plurality of speech bits, each uniquely associated with one of said digitized audio signals.

5. The audio conferencing system of claim 4, wherein said conference list comprises a plurality of conference bits, each uniquely associated with one of said digitized audio signals.

6. The audio conferencing system of claim 3, wherein at least one of said plurality of digital signal processors is configured as a DTMF tone detector, which receives and tests each of said audio signals to determine if a DTMF tone is present and provides a DMTF detect bit indicative thereof, wherein each of said audio signals has a uniquely associated DTMF detect bit.

7. The audio conferencing system of claim 6, wherein said audio conference mixer also receives said DTMF status bits and checks said DTMF detect bit associated with any digitized audio signal to be added to said summed conference signal based upon said speech list, to ensure that said summed conference signal does not include any of said digitized audio signals whose associated said DTMF detect bit indicates the presence of a DTMF tone.

8. The audio conferencing system of claim 6, wherein said audio processor computes an audio detection threshold value based upon said audio signal values, and compares said audio signals to said audio detection threshold value to determine which of said audio signals comprises audio and provides an indication thereof in said speech list.

9. The audio conferencing system of claim 3 wherein said audio processor provides said plurality of digitized audio signals to said audio conference mixer over a dedicated communications link between said audio processor and said audio conference mixer.

10. The audio conferencing system of claim 3 wherein said audio processor provides said plurality of digitized audio signals to said audio conference mixer over said data bus.

11. An audio conferencing platform, comprising:
    means for receiving audio signals associated with conference participants, and for providing a digitized audio signal and a speech bit for each of said audio signals, wherein said speech bit indicates whether or not said associated digitized audio signal includes voice data from the associated conference participant;
    an audio conference mixer adapted to receive said digitized audio signals and said speech bits, and sum a plurality of said digitized audio signals based upon the state of said speech bits to provide a summed conference signal, and provide a conference list indicative of the conference participants whose voice is included in said summed conference signal; and
    means for receiving said summed conference signal and said conference list, for providing said summed conference signal to each of said conference participants that are not on said conference list, and for each conference participant on the conference list removing the digitized audio signal associated with that conference participant from said summed conference signal and providing a resultant difference audio signal to the conference participant on said conference list.

12. The audio conferencing platform of claim 11, wherein said audio conference mixer comprises a first digital signal processor.

13. The audio conferencing platform of claim 12, wherein said means for receiving audio signals comprises a network interface circuit and a second digital signal processor configured to operate as an audio processor, wherein said network interface circuit and said audio processor are interconnected by a time division multiplex (TDM) bus.

14. The audio conferencing platform of claim 11, wherein said means for receiving said summed conference signal and said conference list comprises a digital signal processor.

15. The audio conferencing platform of claim 11, further comprising a time division multiplex (TDM) bus that interconnects (i) said means for receiving audio signals associated with conference participants, (ii) said audio conference mixer and (iii) said means for receiving said summed conference signal and said conference list, wherein said summed conference signal and said conference list are provided over said TDM bus.

16. The audio conferencing platform of claim 11, wherein said audio conferencing platform supports a plurality of simultaneous conferences and said means for receiving audio signals further comprises, means for DTMF tone detection that tests each of said audio signals to determine if a DTMF tone is present and provides a DMTF detect bit indicative thereof, wherein each of said audio signals has a uniquely associated DTMF detect bit.

17. The audio conferencing platform of claim 16, wherein said audio conference mixer comprises means for checking said DTMF detect bit associated with any digitized audio signal to be added to said summed conference signal based upon said speech list, to ensure that said summed conference signal does not include digitized audio signals whose associated DTMF detect bit indicates the presence of a DTMF tone.

18. An audio conferencing platform, comprising:

input circuitry adapted to received audio signals associated with conference participants, and provide a digitized audio signal and a speech bit for each of said audio signals, wherein said speech bit indicates whether or not said associated digitized audio signal includes voice data from the associated conference participant;

an audio conference mixer adapted to receive said digitized audio signals and said speech bits, and sum a plurality of said digitized audio signals based upon the state of said speech bits to provide a summed conference signal, and provide a conference list indicative of the conference participants whose voice is included in said summed conference signal; and processing circuitry adapted to receive said summed conference signal and said conference list, to provide said summed conference signal to each of said conference participants that are not on said conference list, and for each conference participant on the conference list removing the digitized audio signal associated with that conference participant from said summed conference signal and providing a resultant difference audio signal to the conference participant on said conference list.

19. An audio conferencing platform that provides a summed conference signal, said platform comprising:

input circuitry adapted to received audio signals associated with conference participants, and provide a digitized audio signal and a speech bit for each of said audio signals, wherein said speech bit indicates whether or not said associated digitized audio signal includes voice data from the associated conference participant; and a centralized audio conference mixer adapted to receive said digitized audio signals and said speech bits, and sum a plurality of said digitized audio signals based upon the state of said speech bits to provide a summed conference signal, and provide a conference list indicative of the conference participants whose voice is included in said summed conference signal.

* * * * *